United States Patent [19]

Williams

[11] Patent Number: 5,427,155
[45] Date of Patent: Jun. 27, 1995

[54] FLOATABLE FLEXIBLE HOSE

[75] Inventor: John S. Williams, Grimsby, England

[73] Assignee: Dunlop Limited, United Kingdom

[21] Appl. No.: 182,350

[22] Filed: Jan. 18, 1994

[30] Foreign Application Priority Data

Jan. 26, 1993 [GB] United Kingdom ............ 9301479

[51] Int. Cl.⁶ ............................................. F16L 55/00
[52] U.S. Cl. ................................. 138/103; 138/104;
138/137; 138/124; 138/30; 116/210
[58] Field of Search ............... 138/104, 103, 30, 137,
138/124, 178, 109, 121, 122, 126, 148, 177;
285/93, 149; 116/210

[56] References Cited

U.S. PATENT DOCUMENTS

| | | | |
|---|---|---|---|
| 3,119,415 | 1/1964 | Galloway et al. | 138/103 |
| 3,717,180 | 2/1973 | Ambrose et al. | 138/153 |
| 3,972,223 | 8/1976 | Torghele | 138/104 |
| 4,153,079 | 5/1979 | Ambrose | 138/104 |
| 5,244,016 | 9/1993 | Kuroda et al. | 138/103 |

FOREIGN PATENT DOCUMENTS 2117479 10/1983
1503502 3/1978 United Kingdom.

Primary Examiner—David A. Scherbel
Assistant Examiner—Patrick F. Brinson
Attorney, Agent, or Firm—Stevens, Davis, Miller & Mosher

[57] ABSTRACT

A floatable twin carcass hose has a main carcass surrounded by a secondary carcass adapted to expand radially if pressurized fluid leaks through the main carcass to between the two carcasses. There is buoyancy material around the secondary carcass, an outermost cover layer, and inextensible hoop reinforcement between the secondary carcass and outer cover at one or more localized positions along the length of the hose thereby locally to inhibit expansion of the cover if fluid leaks to between the carcasses.

9 Claims, 2 Drawing Sheets

FLOATABLE FLEXIBLE HOSE

BACKGROUND OF THE INVENTION

This invention concerns improvements in or relating to floatable flexible hose and in particular to flexible hose of the type comprising a main fluid retaining carcass and a secondary fluid retaining carcass enclosing at least part of the length of the main carcass to prevent escape of fluid leaking from the main carcass.

Flexible hose of the type referred to above is particularly useful for transporting fluids the escape of which would constitute a severe health or safety hazard and is especially suited to applications where the hose is required to withstand a considerable amount of flexing in use, rough handling during connecting operations and severe weathering, for example in the hose line used to transport oil between a tanker moored offshore and an installation on shore. In assignee's earlier U K Patent Number 1 503 502 a flexible hose of the type referred to above is disclosed in which the secondary carcass is separate from the main carcass and constructed to expand radially under the pressure of fluid leaking through the main carcass which is retained by the secondary carcass. A hose of that type may optionally incorporate buoyancy material in the body of the main-/or secondary carcasses. Alternatively or in addition buoyancy material may be provided between the main and secondary carcasses.

In a hose of the aforementioned construction the expansibility of the secondary carcass enables it to accommodate resiliently, and without damage by shock loads, the potentially sudden increase in pressure forces to which it may be subject upon a failure of the inner, main carcass.

That expansibility of the secondary carcass can be most undesirable for hose used underwater. As discussed in our GB Patent Number 2 117 4791 that expansion adversely affects the delicate balance which may be recovered between the buoyancy (displacement) forces and the weight of the hose if a hose line formed from a string of hoses is to maintain a desired configuration. To avoid or mitigate such problems it is taught in that patent that expansion of the secondary carcass relative to them a in carcass is constrained along the whole of the length of the hose.

In contrast to underwater twin carcass hose in which it can be desirable to avoid significant expansion of the secondary carcass, for floatable flexible hose of a kind adapted to float on the surface of water it is known to provide that the secondary carcass is relatively highly expansible. For example the secondary carcass typically may expand in diameter by 25% to 30% if exposed to the normal working pressure of fluid leaking through the main carcass.

That expansibility provides a potentially useful facility for detecting failure of the main carcass; that can be achieved by simple visual inspection without any need for mechanical or electrical leak detectors. However, although a 30% change in diameter of a secondary carcass is potentially well visible, if a thick layer of buoyancy material is provided around the secondary carcass that expansion may result in a change of only approximately 10% of the outer diameter of the hose, depending on the ratio of hose outer diameter to outer diameter of the secondary carcass. The percentage visible expansion is reduced still further if the buoyancy material is of a kind which compresses upon expansion of the secondary carcass. A consequence is that expansion of the floatable hose is not always clearly visible, especially when in rough waters.

SUMMARY OF THE INVENTION

The present invention aims to provide a twin carcass floatable flexible hose which in comparison with known hoses provides a more visible indication of expansion in the event of leakage of pressurized fluid to between the carcasses.

In accordance with one of its aspects the present invention provides a floatable flexible hose comprising a main fluid retaining carcass, a secondary fluid retaining carcass which encloses at least part of the main carcass and is capable of expanding radially relative to the main carcass on leakage of fluid from the main carcass whereby when subject to the working pressure of the hose said secondary carcass will expand in diameter by at least 20%, buoyancy material surrounding said secondary carcass layer, an outer cover layer surrounding said buoyancy material and substantially circumferentially inextensible hoop reinforcement means positioned in said buoyancy material, between the secondary carcass and the hose cover, to lie axially between the ends of the hose and arranged substantially to inhibit expansion of the hose cover at said axial position.

Preferably the secondary carcass is of a kind which expands by at least 25% and more preferably by at least 30% when subject to the normal working pressure of fluid leaked to between the two carcasses.

The hoop reinforcement means my lie adjacent the outer surface of the secondary carcass or adjacent and preferably bonded or otherwise secured to the hose outer cover thereby to be constrained against radial expansion by the hoop reinforcement means. More preferably the hoop reinforcement means lies substantially wholly embedded in the buoyancy material and it my be spaced from the secondary carcass and/or the outer cover by intervening buoyancy material, preferably a thin layer thereof. Typically that thin layer has a thickness less than 25% of the thickness of the buoyancy material. If the hoop reinforcement means is spaced from the outer cover by intervening buoyancy material, preferably said buoyancy material is arranged to serve as a structural interconnection whereby the hoop reinforcement acts to restrain locally any tendency for the hose cover to expand at or in the near vicinity of the axial location of the hoop reinforcement.

The hoop reinforcement means preferably is of a flexible type construction, for example comprising a plurality of turns of low modulus of elasticity filamentary material.

The reinforcement structure of the main and secondary carcasses typically may comprise one or rare layers of woven or braided material or a helical winding or a combination thereof. The material of the secondary carcass may have a higher elongation, i.e. lower modulus of elasticity material than the reinforcement material of the main carcass. Alternatively or additionally, the secondary carcass may comprise reinforcement elements which extend helically at an angle selected such that when the secondary carcass is subject to internal fluid pressure the angle of reinforcement elements tends to change in a manner which results in an increase in outer diameter of the secondary carcass.

More than one hoop reinforcement means may be provided at positions axially spaced along the length of the hose.

Preferably the spacing of a hoop reinforcement from the or each end of the hose (at which end(s) expansion will also be restrained) and any other corresponding hoop reinforcement in the hose provides that the or each intermediate portion of the hose lying mid-way between successive axially spaced positions of the circumferential restraint is able to expand under the action of fluid pressure between the two carcasses in a manner substantially unrestrained by the hoop reinforcement(s). Thus in the event of fluid leakage to between the two carcasses expansion of the secondary carcass will cause irregular expansion of the surrounding buoyancy and cover layers. In consequence the hose will adopt an irregular external profile which will be visually more apparent than a uniform increase in diameter.

The outer surface of the hose may be provided with a spiral marking which extends between part of the hose cover that is constrained by the hoop reinforcement means and part(s) not so constrained. Expansion of the hose in the event of leakage through the main carcass will locally disrupt the curvature of the marking and so further assist in providing the desired visual alert.

BRIEF DESCRIPTION THE DRAWINGS

An embodiment of the present invention will now be described by way of example and with reference to the accompanying diagrammatic drawing wherein:

FIG. 1 is a longitudinal section view through part of one end of twin carcass hose according to the present invention and associated with an end fitting, and FIG. 2 is a side view of the hose of FIG. 1 and associated with two end fittings, the lower half showing the hose in normal use and the upper half showing the hose in a condition in which pressurised fluid has leaked to between two reinforcement carcasses of the hose.

DETAILED DESCRIPTION OF PREFERRED EMBODIMENTS

Figure 1:
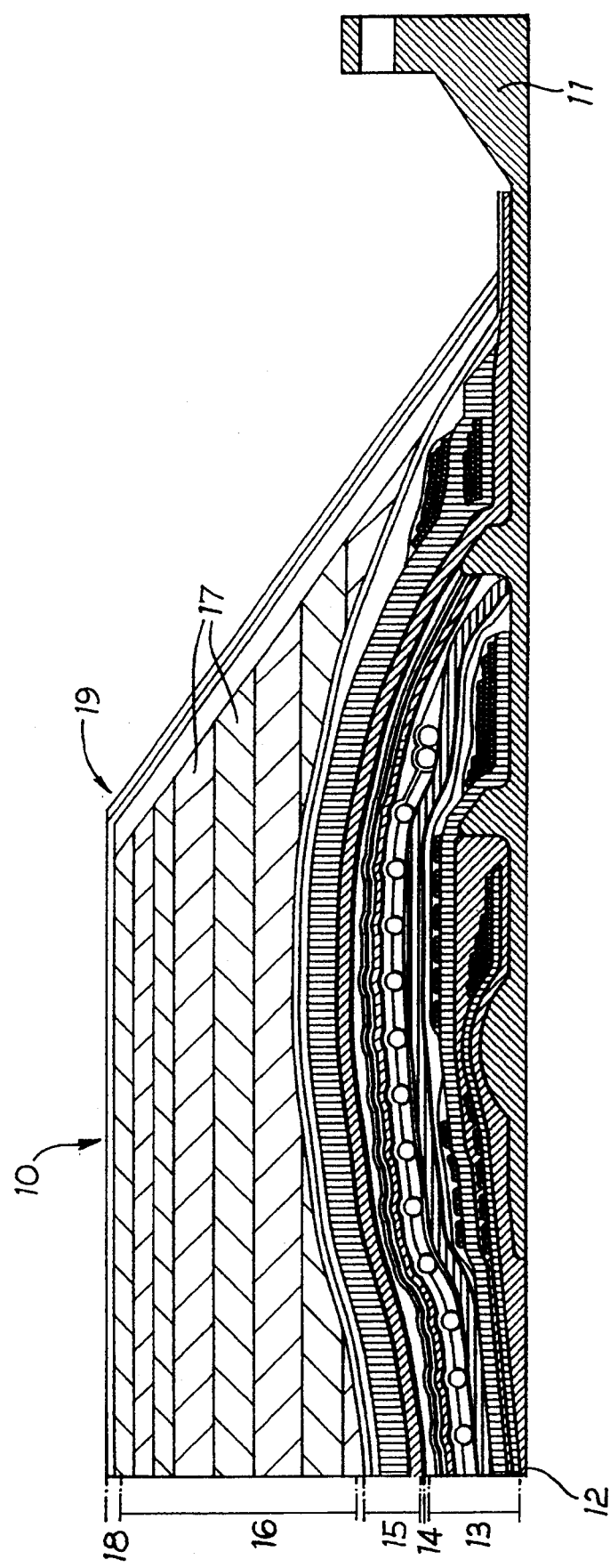

The construction of the end region of hose 10 in accordance with the present invention and as shown in FIG. 1 may be as described in detail in the specification of assignee's British Patent Specification No. 1503502.

In brief that construction of the hose 10 built around a flanged fitting 11 comprises an inner lining layer 12, a main reinforcement carcass assembly 13 surrounded by a crush-resisting buoyancy layer 14, a radially expansible secondary reinforcement carcass assembly 15, a buoyancy assembly 16 comprising a plurality (eg eight) of layers 17 of low density closed cell sponge material and an outer cover layer 18.

The secondary carcass assembly 15 is constructed from high elongation reinforcing material and has a convoluted shape so that it tends readily to expand in diameter by at least 25% (eg 30%) if subject internally to fluid at the normal working maximum pressure of the hose.

Each reinforcement carcass assembly 13,15 is secured in fluid tight manner to the end fitting 11. Each hose end incorporates shoulder plies 19 to constrain radially outwards expansion of the underlying secondary carcass in the event of pressurized fluid leaking through the main carcass 13 and acting substantially directly on a secondary carcass assembly 15.

Figure 2:
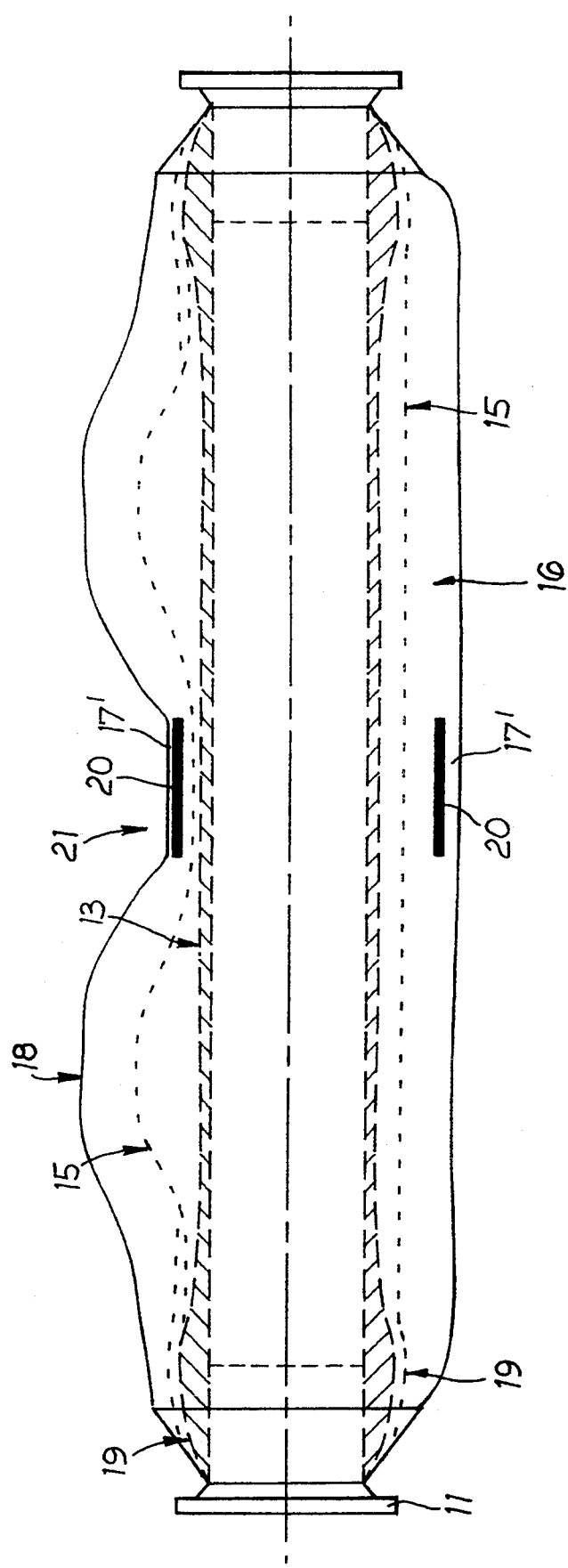

Midway between its ends the hose 10 is provided with an inextensible hoop reinforcement ring 20 at a position which lies within the buoyancy assembly 16 (see FIG. 2). The ring 20 is provided at a radially outer portion of the buoyancy assembly to lie spaced radially from the outer cover 18 by a single, thin type layer 17' of buoyancy material. The ring 20 is secured by bonding to the layer 17' which in turn is bonded to the outer cover 18.

The hose 10 has a generally cylindrical outer shape when in normal use. When pressurised fluid leaks through the main carcass to act substantially directly on the secondary carcass 15 it adopts an expanded outer profile as shown in the upper part of FIG. 2. In this profile the hose has, as usual, a substantially unchanged outer diameter at its endmost regions and additionally has a circumferentially extending depression 21 mid-day between its ends, i.e. at a position axially aligned with the hoop reinforcement ring 20.

The circumferentially extending depression 21 provides a clear visual indication that the hose is in an expanded condition. It does not require an assessment of whether there has keen any change in the overall outer diameter of the hose in order to assess whether fluid might have leaked through the main carcass.

I claim:

1. A floatable flexible hose comprising
   a main fluid retaining carcass,
   a secondary fluid retaining carcass which encloses at least part of the main carcass and is capable of expanding radially relative to the main carcass on leakage of fluid from the main carcass whereby when subject to the working pressure of the hose said secondary carcass will expand in diameter by at least 20%,
   buoyancy material radially outward of and surrounding said secondary carcass layer,
   an outer cover layer surrounding said buoyancy material and
   substantially circumferentially inextensible hoop reinforcement means of flexible construction positioned in said buoyancy material, between the secondary carcass and the hose cover, to lie at an axial position axially between the ends of the hose and arranged substantially to inhibit expansion of the hose cover at said axial position in the event of leakage of pressurized fluid to between said carcasses.

2. A floatable flexible hose according to claim 1 wherein the hoop reinforcement means lies substantially wholly embedded in the buoyancy material.

3. A floatable flexible hose according to claim 2 wherein the hoop reinforcement means is spaced from at least one of the secondary carcass and outer cover by intervening buoyancy material.

4. A floatable flexible hose according to claim 3 wherein said intervening buoyancy material has a thickness less than 25% of the thickness of the buoyancy material which separates the secondary carcass and outer cover.

5. A floatable flexible hose according to claim 1 wherein the hoop reinforcement means is bonded or otherwise secured to the hose outer cover.

6. A floatable flexible hose according to claim 1 wherein the secondary carcass expands by at least 25% when subject to the normal working pressure of fluid leaked to between the two carcasses.

7. A floatable flexible hose according to claim 6 wherein the said expansion is at least 30%.

8. A floatable flexible hose according to claim 1 wherein at least two said hoop reinforcement means are provided at positions axially spaced along the length of the hose.

9. A floatable flexible hose according to claim 1 wherein the outer surface of the hose is provided with a spiral marking at least at a position axially aligned with said hoop reinforcement means.

* * * * *